United States Patent

[11] 3,592,235

| [72] | Inventor | Milton T. Fore |
| | | Houston, Tex. |
| [21] | Appl. No. | 844,783 |
| [22] | Filed | July 25, 1969 |
| [45] | Patented | July 13, 1971 |
| [73] | Assignee | Bell Aerospace Corporation |

[54] DIFFERENTIAL PRESSURE VALVE
8 Claims, 2 Drawing Figs.

| [52] | U.S. Cl. | 137/625.66 |
| [51] | Int. Cl. | F16k 11/07 |
| [50] | Field of Search | 137/458, 460, 467, 625.6, 625.66; 251/61.5 |

[56] References Cited
UNITED STATES PATENTS

| 2,911,990 | 11/1959 | Brown | 137/486 |
| 2,971,530 | 2/1961 | Dewey | 137/458 |
| 3,107,693 | 10/1963 | Puster et al. | 137/625.66 |
| 3,351,094 | 11/1967 | Elbogen et al. | 137/460 X |

*Primary Examiner*—Henry T. Klinksiek
*Attorney*—Nilsson, Robbins, Wills & Berliner ABSTRACT: A differential pressure sensor wherein a flow control member (spool valve) is disposed in operative association with a pressure-displaceable member (diaphragm) of the sensor so as to move therewith to open a pilot line, and which includes spool valve self-locking so that the pilot line is locked in an open position.

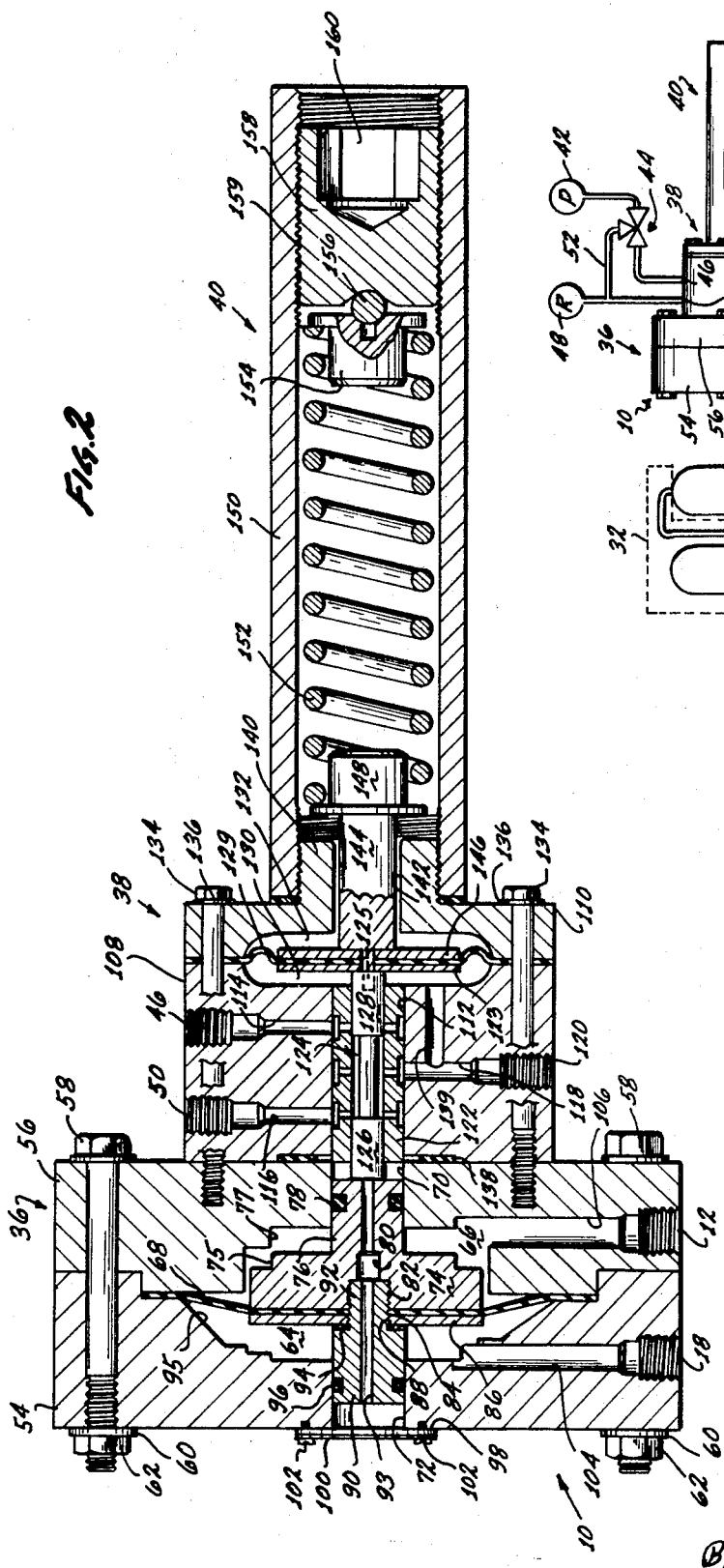
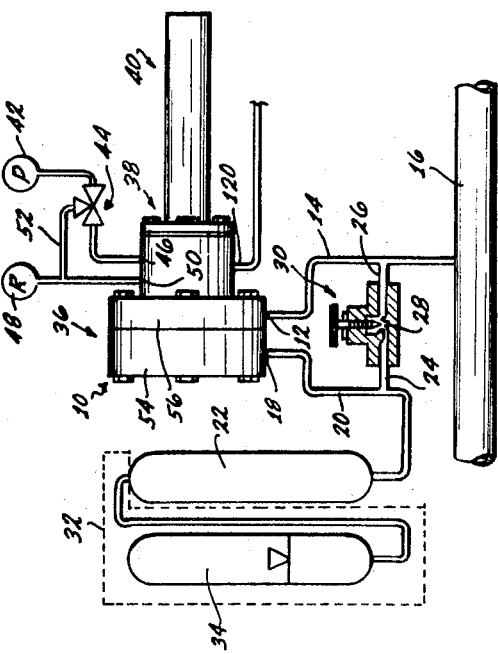
INVENTOR
MILTON T. FORE
By Nilsson + Robbins
ATTORNEYS

DIFFERENTIAL PRESSURE VALVE

BACKGROUND OF THE INVENTION

1. Field of the Invention

The fields of art to which the invention pertains include the fields of fluid handling, valve and valve actuation.

2. Description of the Prior Art

The term "hydraeric" as used throughout the specification and claims is intended to be generic to fluid under pressure and includes both hydraulics and pneumatics.

Differential pressure valves are used to sense a relatively low differential pressure at high static pressure. The device operates to monitor a pressure differential across a calibrated orifice which may be built into the device or which may be a separate component. For example, by connecting one pressure port of the device to a pipeline and the other to a volume tank and bridging the ports with the calibrated orifice, the rate of pressure change in the pipeline may be monitored. As the pressure falls, a differential pressure is generated across the orifice which, if greater than a preset limit, signals a valve control to close appropriate valves.

Typically, the differential pressure valve includes a sensor section including a diaphragm responsive to pressure differentials and which is spring biased to a monitor position. The tension of the spring is adjustable so that a predetermined pressure differential is required to return the diaphragm to a null position. When the pressure differential exceeds that of the spring bias, the diaphragm is moved from the monitor position to a signal position and such movement displaces a fluid flow control member to generate a hydraeric control signal. Upon decrease of the pressure differential, the spring bias returns the diaphragm to its monitor position which, in turn, returns the fluid flow control member to its original position. The result is that any hydraeric signal generated by the fluid flow control member lasts only as long as the pressure differential and cannot be utilized to perform an extended or continuing function. The fluid flow control member cannot itself pilot a line valve to close, but requires the utilization of auxiliary equipment for that purpose.

SUMMARY OF THE INVENTION

The present invention provides an improvement in differential pressure valves in which the pilot valve is self-locking in that when the pressure differential exceeds a preset level, a pilot signal is generated that is not automatically removed when the differential pressure drops back below the preset level. The pilot valve contains a flow control member which is associated through a removable coupling with the sensor diaphragm so as to effect a hydraeric signal when the diaphragm is displaced, but means are provided for then releasing the flow control member from such association so that it is not automatically returned with the diaphragm.

In specific embodiments, the pilot valve comprises a housing defining a signal or outlet port, a hydraeric fluid intake port and a hydraeric path from the intake port to the signal port. The flow control member is in the form of a spool valve and the housing defines a bore in the hydraeric path in which the spool is disposed for translation. One end of the spool abuts a force transfer means in the form of a sensor piston member which carries the sensor diaphragm, but the spool is otherwise unconnected to the piston member, and the other end of the spool is connected to a pilot valve locking means in the form of a diaphragm. An independent hydraeric pressure source is provided and connected to the pilot valve intake port. When the sensor diaphragm is displaced from a monitor position to a signal position in response to a predetermined pressure differential, the flow control spool is translated within its bore to effect communication between the intake port and the pilot line port and, at the same time (a) displaces the pilot valve diaphragm and (b) effects communication between the independent hydraeric fluid source and the pilot valve diaphragm to maintain the diaphragm in its displaced position; since the flow control spool is connected to the pilot valve diaphragm, but not to the sensor diaphragm, it is locked in its open position. Once the spool has been shuttled to its open position, it can only be reset by relieving the independent hydraeric fluid pressure as by disconnecting the source thereof from said intake port.

BRIEF DESCRIPTION OF THE DRAWINGS

FIG. 1 is an elevational, partly schematic view of a differential pressure valve of this invention and auxiliary components connected to a pipeline; and FIG. 2 is a vertical, sectional view of the differential pressure valve of FIG. 1.

DETAILED DESCRIPTION

Referring to FIG. 1, there is illustrated a differential pressure valve 10 having one pressure port 12 (FIG. 2) connected via a conduit 14 into a pipeline 16 through which flows fluid to be monitored. The other differential pressure valve port 18 (FIG. 2) is connected via a conduit 20 to a volume tank 22. Bridging conduits 24 and 26 connect the pressure port conduits 14 and 20 across a calibrated orifice 28 which is defined by a flow control valve 30. The flow control valve 30 is adjustable so as to effect a desired pressure differential across the orifice 28 in the event of a sudden decrease in pressure within the pipeline 16, as by a break in the pipeline 16. If necessary, as indicated by the dashed line 32, an accumulator 34 can be connected to the volume tank 22 to aid in obtaining a desired pressure differential.

As will be described in more detail hereinafter, the differential pressure valve is comprised of three main sections, a differential pressure sensor section 36, a pilot valve section 38, and a spring bias section 40. A pressure source 42 is connected via a three-way valve 44 to the intake port 46 (FIG. 2) of the pilot valve section 38 and an exhaust part return 48 is connected to an exhaust 50 (FIG. 2) of the pilot valve section 38. A conduit 52 connects the exhaust return 48 to the three-way valve 44 so that connection between the pilot valve section 38 and the pressure source 42 and exhaust return 48 may be thereby reversed for a purpose hereinafter described.

Referring to FIG. 2, the differential pressure sensor section 36 includes mated housing halves 54 and 56 connected together by means of machine screws 58, washers 60 and nuts 62. The housing halves 54 and 56 are milled on their inner surfaces to form a pair of chambers 64 and 66 which are separated by a diaphragm 68 as hereinafter described. Each half of the sensor housing is formed with a bore 70 or 72 centrally therethrough. The diaphragm 68 is carried by a piston 74 which is formed with a central shaft portion 76 for translation in the bore 70 of the right side (with respect to the drawing) sensor housing half 56. The shaft portion 76 is provided with an O-ring 78 to effect a close-fit sliding seal with the bore 70. The piston 74 and sensor half 56 are formed with mating contoured surfaces 75 and 77, respectively, so that they close-fit against each other.

In assembly, the piston 74 is disposed on the right side housing half 56 with its shaft portion 76 within the bore 70. The piston 74 is provided with an aperture 80 formed centrally therethrough and includes a threaded counterbore 82 on the left side of the piston 74. An annular, metallic diaphragm 68, formed with a central aperture 84 is positioned over the piston 74 with the apertures 84 and 80 aligned. A metal diaphragm plate 86 formed with a central aperture 88 and having the same diameter as the piston 74 is positioned over the diaphragm 68 with its aperture 88 aligned with the diaphragm and piston apertures 84 and 80. A shaft member 90 having a centrally extending portion 92 which is threaded to mate with the threads 82 of the piston is threaded into the piston aperture 80 to secure the diaphragm 68 and diaphragm plate 86 to the piston 74. The shaft member 90 is formed with a central aperture 93 therethrough which communicates with the piston aperture 80 so as to effect communication between opposite sides of the sensor housing. The shaft member 90 is sealed to the diaphragm plate 86 by means of threadseal material, at 94. The left-side housing half 54 is then positioned so that its outer edge engages the right side housing half 56 and its surface 95 is contoured inwardly therefrom to pinch the rim of the diaphragm 68. The shaft member 90 is disposed in the bore 72 of the left-side sensor housing half 54. An O-ring 96 is provided on the shaft member 90 to effect a close-fit sliding seal with the bore 72. The sensor housing halves 54 and 56 are then secured together by means of the bolts 58, washers 60 and nuts 62. A gasket 98 and dust cover 100 are secured to the outer surface of the left-side sensor section 54 over the bore 72 by means of machine screws 102.

As noted, the inner surfaces of the sensor halves 54 and 56 are contoured to provide chambers 64 and 66 on opposite sides of the diaphragm 68. Each half 54 and 56 has a passageway 104 and 106, respectively, drilled from one edge thereof into the respective chambers 64 and 66. The outer end portions of the passageways 104 and 106 are machined and threaded to form the pressure intake ports 18 and 12, respectively, referred to above with respect to the description of FIG. 1.

Referring now to the pilot valve section 38, this is comprised of a generally cylindrical valve body housing 108 and a cylindrical guide member 110 of the same diameter. The valve body housing 108 is formed with a bore 112 defined centrally therethrough, and a fluid intake passageway 114, a fluid exhaust passageway 116 and a pilot line passageway 118 drilled from the outer surface thereof through to the central bore 112. The outer end portion of each passageway 114, 116 and 118 are threaded to form, respectively, the fluid intake port 46, fluid exhaust port 50 and a pilot line port 120. A metal sleeve 122 is disposed within the bore 112 and is provided with ports aligned with the passageways 114, 116 and 118. A metal spool 124 is disposed within the sleeve 122 and is formed with lands 126 and 128 on the ends thereof spaced so that the annular space between the lands 126 and 128 effects communication between the pilot line passageway 118 and either the exhaust passageway 116 or the fluid intake passageway 114, depending upon its translation position. drawing) thereof in the vicinity of the diaphragm plate 123 and a diaphragm 129 comprised of fabric is disposed on the diaphragm plate 123 with the edges of the diaphragm being secured between the outer rim of the valve body housing 108 and the inner rim of the guide member 110. The inner surface of the guide member 110 is also dished out centrally thereof to effect the securement of the diaphragm 129 and to provide chambers 130 and 132 on opposite sides of the diaphragm 129. The guide member 110 is secured to the valve body housing 108 by means of machine screws 134 and washers 136. The machine screws 134 extend through the guide member 110, the rim of the fabric diaphragm 129 and the valve body housing 108 and are threaded into the right side surface of the sensor housing section 56 to secure the pilot valve section to the sensor section. A valve gasket 138 is provided between the pilot valve section and the sensor section to insure an airtight securement.

A passageway 139 is laterally formed in the valve body housing 108 from the pilot line passageway 118 to the left-side chamber 130 for purposes hereinafter described.

The guide member 110 is formed centrally with an extended portion 140 defining a bore 142 therethrough. A plunger 144 is disposed within the guide member bore 142 and loosely fit therein so as to enable the ready leakage of air. The left side of the plunger 144 is formed with the threaded dowel 125 which extends through a central aperture in a diaphragm plate 146 on the right side of the diaphragm 129, through the left-side plate 123 and into the spool land 128. The right side of the plunger 144 is formed with a spring guide member 148 for purposes hereinafter described.

Considering now the spring bias section 40, this comprises an elongated tubular housing 150 provided internally with threads on its left side for threaded engagement with the extended guide member portion 140. A helical coil spring 152 is disposed within the spring housing 150 in engagement with the spring guide member 148. Another spring guide member 154 is disposed on the opposite side of the spring 152 and is shaped on its right side to accommodate a pivot ball 156 which, in turn, is abutted by a cylindrical threaded spring adjustment member 158. The spring adjustment member 158 is threaded in engagement with threads 159 formed internally of the spring housing 150 and is formed with a keyway 160 on its right side whereby its position within the spring housing 150 may be adjusted to thereby adjust the tension on the spring 152.

In operation, the referring additionally to FIG. 1, the conduits 14 and 20 are connected to the pressure ports 12 and 18, respectively, whereby fluid pressure from the pipeline 16 is applied to opposite sides of the sensor diaphragm 68 via the pressure passageways 104 and 106. The spring 152 exerts a biasing force against the plunger 144 which is transmitted via the pilot valve spool 124 against the piston 74 and thereby against the diaphragm 68 so that if fluid pressure on opposite sides of the diaphragm 68 are equal or if the pressure applied through passageway 104 is less than the pressure applied through passageway 106, the diaphragm 68 is forced toward the left-side housing half 54. When the pressure in the left-hand passageway 104 becomes sufficiently larger than the pressure through the right-hand passageway 106 so that the spring 152 bias is overcome, the diaphragm 68 moves against the right side sensor housing half 56, the piston extension member 76 translating through the sensor bore 70. This effects a translation to the right of the abutting pilot valve spool 124.

Prior to such translation, the annular space between the spool lands 126 and 128 effects communication between the pilot valve exhaust passageway 116 and the pilot line passageway 118. An independent source of hydraeric pressure 42 is connected to the fluid intake passageway 114 but is sealed by the low clearance fit between the sleeve 122 and the spool land 128 thereat. This metal-to-metal seal prevents pressure from entering the pilot line passageway 118 as long as the diaphragm 68 does not move to the right. Any leakage which might occur across this metal-to-metal seal would be vented through the exhaust port passageway 116 and would not pressurize the pilot line.

Subsequent to translation of the spool 124, communication between the exhaust passageway 116 and the pilot line passageway 118 is shut off by the left-side spool land 126. At that point, communication is effected between the fluid intake passageway 114 and the pilot line passageway 118 and fluid is allowed to flow into the pilot line. Simultaneously, fluid enters the lateral passageway 139 to hold or move the pilot valve diaphragm 129 against the force of the spring 152. Pressure from the source 42 and the spring tension are chosen so that the force exerted by such pressure against the pilot valve diaphragm 129 overcomes the biasing force of the spring 152. The land 126 on the spool 124 may separate from the sensor piston 74. The result is that the pilot spool 124 away from the sensor piston 74. The result is that the pilot mechanism is separated from the differential pressure sensing mechanism and is locked in position by the independent pressure from the source 42. After this pressure lockup occurs, any subsequent change in the pressures in the sensor passageways 104 and 106 will not affect the pilot valve mechanism until the independent pressure supply 42 has been shut off and vented.

Referring additionally to FIG. 1, by operation of the three-way valve 44, pressure can be released from the intake fluid passageways 114 into the exhaust 48 to release pressure from the pilot valve diaphragm 129. When this occurs, the spring 152 is unrestrained and returns the diaphragm 129 and spool 124 to their original positions, wherein the left side spool land 126 again abuts the sensor piston extension 76. Manipulation of the three-way valve 44 to connect the pressure source 42 to the fluid intake passageway 114 and the exhaust 48 to the exhaust passageway 116 resets the pilot mechanism so as to be ready to trip again at the proper differential pressure.

What I claim is:

1. In a differential pressure valve including a sensor member movable between a monitor position and a signal position responsive to a predetermined pressure differential, and means for biasing said sensor member to said monitor position in the absence of said predetermined pressure differential; a pilot valve for providing a pressure signal upon movement of said sensor member to said signal position, said pilot valve comprising:

a housing defining an inlet port and an outlet port and a fluid flow path between said ports;

valve means movable between first and second positions positioned in said flow path for controlling fluid flow between said ports;

force transfer means removably coupling said sensor member and said valve means for moving said valve means from said first position to said second position when said sensor member moves from said monitor position to said signal position; and locking means connected to said valve means for maintaining said valve means in said second position.

2. The invention according to claim 1 wherein said force transfer means includes shaft means affixed to said sensor member and movable therewith, said shaft means being in engagement with said valve means during the time said sensor member is in said monitor position and said valve means is in said first position.

3. The invention according to claim 1 wherein said locking means includes a fluid pressure responsive member connected to said valve means, movement of said valve means toward said second position applying fluid pressure from a source thereof to said pressure responsive member.

4. The invention according to claim 1 wherein said valve means is a spool valve slidable within a bore defined by said housing and said locking means is a diaphragm member and wherein said housing further defines passageway means connected to said flow path downstream from said valve means for applying fluid pressure to said diaphragm member upon movement of said valve member toward said second position.

5. The invention according to claim 1 wherein said housing defines a bore and said valve means is a spool slidably positioned within said bore and maintained in said first position by said bias means until the occurrence of said predetermined pressure differential.

6. The invention according to claim 5 wherein said locking means includes a diaphragm member, said diaphragm member and said spool valve being disposed between and in contact with said biasing means and said sensor member so as to communicate said bias to said sensor member, said diaphragm member being formed to move in opposition to said bias in response to the application of fluid pressure thereto, and including means for applying fluid pressure to said diaphragm member in a direction opposing said bias with sufficient pressure to overcome said bias.

7. The invention according to claim 1 which further includes a source of fluid under pressure and means connecting said source of fluid under pressure to said inlet port.

8. The invention according to claim 7 wherein said locking means is actuated by fluid pressure from said source thereof connected to said inlet port being supplied thereto by movement of said valve means from said first to said second position, and further including control means connected in said means connecting said source of fluid to said inlet port for applying and for disconnecting said source of fluid under pressure with respect to said inlet port thereby to deactivate said locking means by removal of fluid pressure therefrom.